United States Patent [19]

Mair

[11] Patent Number: 5,652,009
[45] Date of Patent: Jul. 29, 1997

[54] ENHANCED HYDRATION EXTRUSION COOKING SYSTEM, METHOD AND PRODUCT

[75] Inventor: Colin D. Mair, Sabetha, Kans.

[73] Assignee: Extru-Tech, Inc., Sabetha, Kans.

[21] Appl. No.: 626,122

[22] Filed: Apr. 1, 1996

[51] Int. Cl.⁶ .............................. A23K 1/00; A23L 1/00; A47J 27/00
[52] U.S. Cl. ........................... 426/516; 99/348; 99/353; 99/357; 99/536; 426/510; 426/523; 426/805
[58] Field of Search .................... 426/516, 506, 426/510, 635, 805, 1, 523; 99/348, 353, 357, 484, 536

[56] References Cited

U.S. PATENT DOCUMENTS

| | | | |
|---|---|---|---|
| 3,256,800 | 6/1966 | Halldorsson | 426/523 |
| 3,548,743 | 12/1970 | Pikel | 99/353 |
| 3,642,489 | 2/1972 | Bartley et al. | 426/516 |
| 3,685,429 | 8/1972 | McBride | 99/355 |
| 3,828,661 | 8/1974 | Vink | 99/483 |
| 3,861,287 | 1/1975 | Manser | 99/348 |
| 3,868,469 | 2/1975 | Chalin | 426/516 |
| 3,881,024 | 4/1975 | Pahoundis, Sr. et al. | 426/516 |
| 3,889,007 | 6/1975 | Gunter et al. | 426/805 |
| 3,934,038 | 1/1976 | Kerr | 426/805 |
| 3,970,761 | 7/1976 | Wenger et al. | 426/506 |
| 3,971,306 | 7/1976 | Wiese et al. | 99/348 |
| 4,042,715 | 8/1977 | Wenger et al. | 426/801 |
| 4,099,455 | 7/1978 | Wenger et al. | 426/802 |
| 4,118,164 | 10/1978 | Wenger et al. | 425/202 |
| 4,138,938 | 2/1979 | Kitamura | 99/353 |
| 4,245,552 | 1/1981 | Small et al. | 99/536 |
| 4,250,802 | 2/1981 | Rubio | 99/353 |
| 4,285,271 | 8/1981 | Falck et al. | 99/348 |
| 4,328,741 | 5/1982 | Yoshikazu | 99/332 |
| 4,510,110 | 4/1985 | Mazzoni | 425/197 |
| 4,584,024 | 4/1986 | Hisada et al. | 426/805 |
| 4,646,631 | 3/1987 | Ward | 99/483 |
| 4,846,053 | 7/1989 | Lane | 99/348 |
| 4,846,054 | 7/1989 | Mange et al. | 99/483 |
| 4,901,635 | 2/1990 | Williams | 99/348 |
| 4,938,127 | 7/1990 | van Lengerich | 99/353 |
| 4,981,711 | 1/1991 | Kearns et al. | 426/805 |
| 5,077,074 | 12/1991 | Van Lengerich | 426/516 |
| 5,096,406 | 3/1992 | Brooks et al. | 425/205 |
| 5,102,671 | 4/1992 | Coles | 426/516 |
| 5,128,153 | 7/1992 | Axelrod | 426/805 |

*Primary Examiner*—George Yeung
*Attorney, Agent, or Firm*—Litman, McMahon and Brown, L.L.C.

[57] ABSTRACT

An enhanced hydration extrusion cooking system, method and extruded product are provided which utilize a conventional extrusion cooking system with a material feed bin feeding material to a conditioning cylinder, from which it is fed to a cooking or forming extruder. An enhanced hydration subsystem is provided for providing a high-starch slurry to the conditioning cylinder, which can be gelatinized immediately prior to or promptly upon entry to the conditioning cylinder. The enhanced hydration subsystem includes a make-up tank receiving high-starch powder and water, which are mixed therein to form a slurry. The slurry is transferred to a pumping tank, from which metered amounts of the slurry are pumped to the conditioning cylinder. The slurry provides a source of pre-gelatinized starch which facilitates the extrusion cooking process and provides a number of desirable characteristics in the extruded product.

20 Claims, 2 Drawing Sheets

ENHANCED HYDRATION EXTRUSION COOKING SYSTEM, METHOD AND PRODUCT

BACKGROUND OF THE INVENTION

1. Field of the Invention

The present invention relates generally to extrusion cooking systems, and in particular to an enhanced hydration subsystem for providing a high-starch slurry to the extrusion cooking system for improving extrusion cooking performance and the characteristics of the finished products.

2. Description of the Related Art

Extrusion cooking systems are commonly used for a wide variety of products and include extruders of various configurations wherein feed materials are cooked and formed to produce various finished products, such as animal feed and food products for human consumption. Such extrusion systems can be adjusted for a wide variety of operating conditions according to the requirements of particular applications. For example, factors such as product density (for floating or sinking aquaculture feed products), starch content, protein levels, oil content and fat content can be adjusted as necessary to produce desired finished products.

By way of example, aquaculture feed products comprise a class of feed materials which are particularly well suited for extrusion manufacture. There is considerable demand for such products in the aquaculture industry, which requires feed materials having certain nutrient and other characteristics for optimizing aquaculture growth. For example, aquaculture growth can be enhanced by providing relatively high oil content in the feed products.

It is often desired that such feed products have specific gravities greater than 1.00 so that they will sink upon dispersal in a body of water containing aquacultures such as fish or shrimp. Such sinking feed products are often preferred for types of aquaculture which tend to bottom feed because such feed materials tend to be consumed more rapidly and are thus less susceptible to waste and spoilage. The water inhabited by such aquaculture thus tends to remain cleaner and healthier.

A common problem with extruding sinking fish feed relates to the effects of extrusion cooking on materials with relatively high starch contents, which are commonly required to provide the resulting feed materials with necessary nutritional values. The problem is that in the extruder the starches tend to expand upon cooking, thus reducing the product density. Moreover, extrusion cooking can be somewhat inefficient if all of the starches in the materials must be gelatinized in the extrusion cooking stage.

SUMMARY OF THE INVENTION

In the practice of the present invention, an enhanced hydration extrusion cooking system, method and product are provided. The extrusion cooking system includes a live feed material bin for mixed and ground feed ingredients, which are thereafter transferred by a feed screw to a conditioning cylinder. The conditioning cylinder is connected to a stem source and functions to pre-cook or condition the feed material. Preferably starches within the feed materials are pre-gelatinized in the conditioning cylinder. The preconditioned feed material is then cooked and/or expanded in an extruder, which outputs a substantially finished product for cooling, drying, packaging or additional processing. An enhanced hydration or slurry subsystem is provided for introducing high starch slurry into the conditioning cylinder.

The slurry subsystem includes a make-up tank which receives water and high-starch powder, mixes same to form a slurry and discharges the slurry suspension to a pumping tank. From the pumping tank the slurry suspension is pumped in metered amounts to the conditioning cylinder. Immediately prior to entry into the conditioning cylinder, or immediately thereafter, the slurry suspension is cooked and the starches therein pre-gelatinized. The pre-gelatinized starches provided by the slurry suspension upon entry into the conditioning cylinder facilitate cooking, reduce energy consumption (both steam and electrical) by the extruder and enhance certain desirable characteristics of the extruded product, such as its oil content.

OBJECTS AND ADVANTAGES OF THE INVENTION

The principle objects and advantages of the present invention include: providing an enhanced hydration subsystem for an extrusion cooking system; providing such an enhanced hydration subsystem which can improve the efficiency of the extrusion cooking system; providing such an enhanced hydration subsystem which utilizes a farinaceous slurry mix; providing such an enhanced hydration subsystem which can significantly increase moisture contents of extrusion cooking materials without incurring undue disadvantages; providing such an enhanced hydration subsystem which can improve the protein content of an extruded product; providing such an enhanced hydration subsystem which can improve the fat content of an extruded product; providing such an enhanced hydration subsystem which can improve the oil content of an extruded product; providing such an enhanced hydration subsystem which can improve the mineral content of an extruded product; providing such an enhanced hydration subsystem which can facilitate the production of sinking aquaculture feed products; providing such an enhanced hydration subsystem which is adapted for use in conjunction with a conditioning cylinder in an extrusion cooking system; providing a method of enhancing hydration in an extrusion cooking process; providing a product which is extrusion cooked utilizing a hydration enhancing method in an extrusion cooking process; and providing an enhanced hydration system, method and product which are economical, efficient and particularly well adapted for the proposed uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
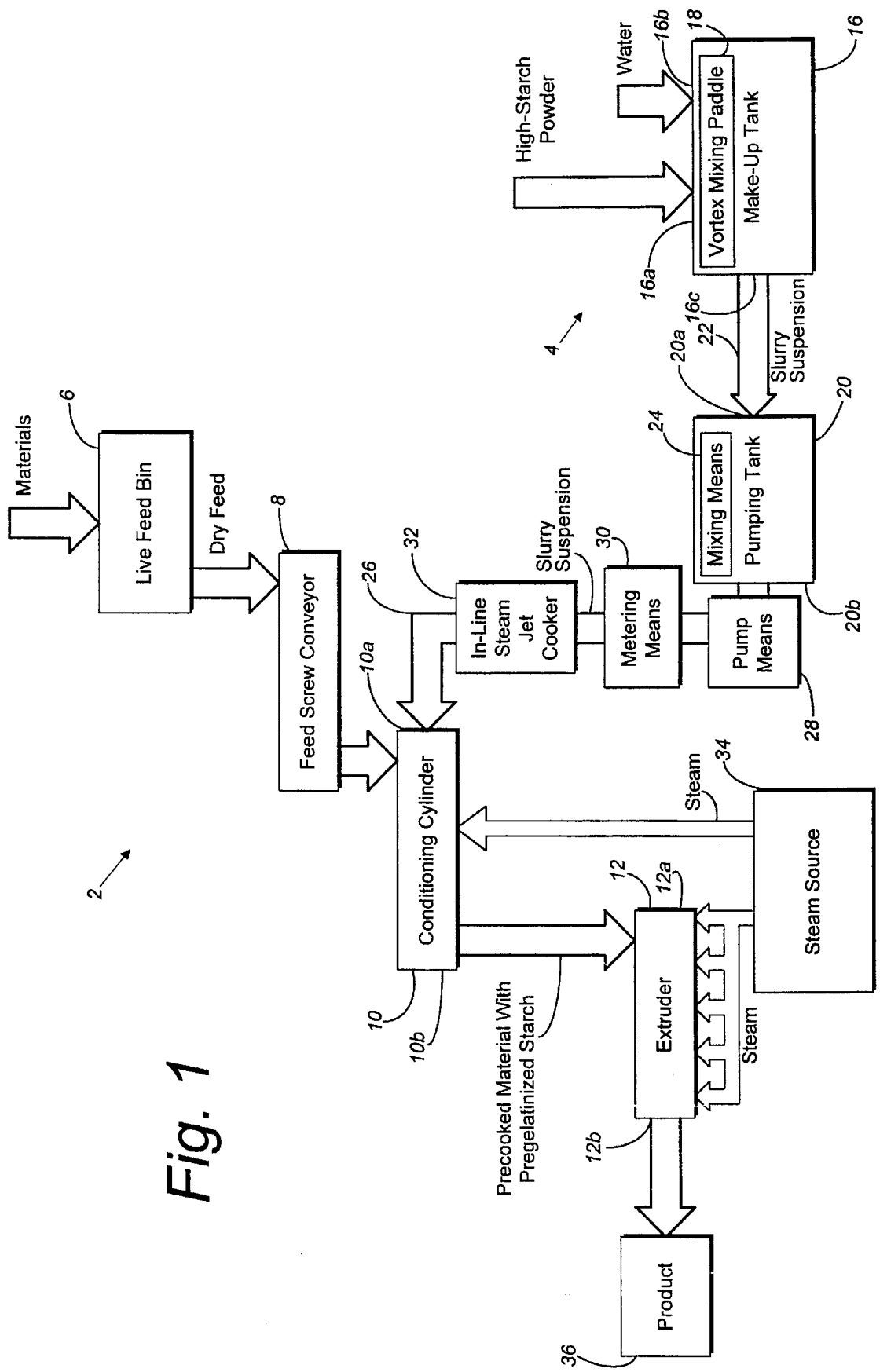
FIG. 1 is a schematic, block diagram of an enhanced hydration subsystem for an extrusion cooking system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally indicates an extrusion cooking system with a slurry or enhanced hydration subsystem 4 embodying the present invention.

II. Extrusion Cooking System 2

The extrusion cooking system 2 includes a feed bin or live bin 6 wherein appropriate feed materials which have been mixed and ground are received for metered, controlled flow to the extrusion cooking system by means of a conveyor 8, which can comprise, for example, a feed screw. A conditioning cylinder 10 is provided which includes inlet and discharge ends 10a, 10b respectively. The feed screw conveyor 8 communicates with the conditioning cylinder inlet end 10a.

The purpose of the conditioning cylinder 10 is to precook the material from the feed bin 6 to provide greater efficiency in cooking the material in the extruder 12. To this end the preconditioning cylinder 10 can be provided with steam injection from a steam source 34.

An extruder 12 is provided which can comprise an appropriate model from among a number which are commercially available from the assignee of the present application, Extru-Tech, Inc. of Sabetha, Kans., and which suit the requirements of a particular application of the extrusion cooking system 2.

The extruder 12 includes inlet and discharge ends 12a, 12b. The extruder discharge end 12b can be equipped with an appropriate die plate for forming product discharged therefrom, and can be provided with automatic cut-off knives for cutting the finished product into discrete, individual elements or pieces. The extrusion cooking system 2 described thus far represents a relatively typical design of an extrusion cooking system and can be assembled from various components which are commonly commercially available. Such an extrusion cooking system and its components, including the conditioning cylinder 10 and the extruder 12, are available from the assignee of the present application, Extru-Tech, Inc. of Sabetha, Kans. The extrusion cooking system 2 can comprise a portion of a larger manufacturing system, which can include additional equipment such as dryers, packaging or bagging equipment, etc.

II. Hydration Subsystem 4

The extrusion cooking system 2 includes a hydration subsystem 4 adapted for premixing a starch-based slurry and pumping same into the conditioning cylinder inlet end 10a. The hydration subsystem 4 includes a make-up tank 16 which receives water and starch-containing powder in an appropriate ratio. For example, a water-to-powder ratio of approximately 2:1 can be provided for use in the extrusion cooking system 2 of the present invention. The water can be temperature-controlled as required for particular products and cooking conditions. For example, its temperature can vary from 10° C. to 60° C. A vortex mixing paddle 18 is provided in the make-up tank 16 for thoroughly mixing the water and powder to form a lump-free slurry.

The make-up tank 16 includes a powder inlet 16a, a water inlet 16b and a slurry outlet 16c. A pumping tank 20 is provided and includes a slurry inlet 20a and a slurry outlet 20b. The make-up tank slurry outlet 16c and the pumping tank slurry inlet 20a are connected by a suitable conduit 22 for passing or transferring the slurry suspension from the make-up tank 16 to the pumping tank 20, which can be accomplished by gravity flow or by a suitable pumping mechanism.

Within the pumping tank 20 the slurry suspension is gently mixed by suitable mixing means 24, which can comprise a suitable circulating pump or stirring mixer. A pumping tank-to-conditioning cylinder conduit 26 is provided between the pumping tank outlet 20b and the conditioning cylinder inlet 10a and is fluidically connected to slurry pump means 28 and slurry metering means 30.

The pumping tank-to-conditioning cylinder conduit 26 also fluidically communicates with an in-line stem jet cooker 32 which is connected to the steam source 34. The in-line steam jet cooker 32 comprises slurry suspension precooking means for cooking the slurry prior to its introduction into the conditioning cylinder 10.

IV. Enhanced Hydration Extrusion Cooking Method

Farinaceous powder and water are introduced into the make-up tank 16 through the inlets 16a, 16b respectively and mixed therein by means of the vortex mixing paddle 18. Although a wide variety of suitable farinaceous powders can be utilized in connection with the extrusion cooking system 2, preferably a high-starch powder is utilized in a ratio of approximately two parts water to one part powder. The pumping tank 20 receives thoroughly mixed slurry suspension from the make-up tank 16 and pumps metered amounts of same, by means of the slurry pumping means 28 and the slurry metering means 30 to the conditioning cylinder 10, with an optional precook step which can be accomplished by means of the in-line steam jet cooker 32. High-starch slurry suspension which has either been precooked by means of the in-line steam jet cooker 32, or which cooks relatively rapidly upon introduction to the conditioning cylinder inlet end 10a, is thus available in the conditioning cylinder 10 for mixing with the feed materials from the live feed bin 6. The pre-cooked slurry suspension, upon introduction into the conditioning cylinder 10, thus provides a source of pre-gelatinized starch at the conditioning cylinder inlet end 10a, which significantly facilitates precooking in the conditioning cylinder 10 and cooking in the extruder 12.

The combined slurry suspension and feed material pre-extrusion mixture thus includes pre-gelatinized starch which has the practical effect of significantly reducing the energy required for cooking in the extruder 12. Energy expended in operating the extruder 12 is primarily from two sources: (1) the steam injected into the steam jackets in the extruder barrel; and (2) the mechanical energy (normally from electrical power) used to drive the extruder 12. Energy requirements for the extrusion process in connection with both energy sources can be significantly reduced by use of the enhanced hydration subsystem 4.

V. Hydration Enhanced Extruded Product 36

The extrusion cooking system 2 with the enhanced hydration subsystem 4 embodying the present invention can be utilized for extruding a wide variety of products 36 with different characteristics as required for particular applications. Pre-gelatinizing the starch by means of the enhanced hydration subsystem 4 can have the effect of increasing the amounts of oil and fat in the finished extruded product 36, which is very important in certain types of feed for enhancing the nutritional values thereof, particularly with respect to the feeding of aquaculture marine life and facilitating weight gains therein in controlled feeding conditions. For example, essential marine oil percentages can be increased from levels of approximately 8.5% with conventional extrusion processes to oil levels in the range of 14% to 19% with the enhanced hydration subsystem 4 embodying the present invention. Generally increased growth rates and higher aquaculture operation productivity generally result from the higher oil contents in the finished products extruded with high starch hydrated farinaceous slurry injected into and pre-gelatinized in the conditioning cylinder 10.

Alternatively, product 36 can be produced from materials with lower starch levels and with comparable oil levels in the finished product by utilizing the enhanced hydration subsystem 2 of the present invention. Thus, product 36 can be formulated thereby with comparable nutrient oil levels to those achieved with conventional extrusion processes, but with less starch content in the ingredient materials which can result in a lower cost of the finished product, particularly when factored in with the aforementioned savings in both steam and electrical energy.

Yet another advantage of extrusion cooking with the enhanced hydration subsystem 4 relates to the precooking or pre-gelatinization of the starch contained in the slurry which occurs upon its introduction into the conditioning cylinder 10 or prior thereto in the in-line steam jet cooker 32. Such pre-cooking/pre-gelatinization of the starch in the slurry which occurs in the conditioning cylinder 10 permits cooking in the extruder at lower energy levels, with the pre-cooked/pre-gelatinized starch functioning to bond together the rest of the starch in the ingredient materials. Such adhesive bonding of the ingredient materials has the effect of increasing the density of the finished, extruded product, thus facilitating the production of a sinking aquaculture food with a relatively high starch content.

Yet another advantage of the enhanced hydration subsystem 4 is that by reducing the required cooking temperatures in the extruder 12 and/or reducing the cook time therein, less of the nutritional vitamins are lost through being cooked away, thus enhancing the nutritional content of the finished extruded product 36.

The reduced cooking times and temperatures made possible with the enhanced hydration subsystem 4 provide similar benefits in connection with retaining other desirable characteristics of the feed ingredient materials. For example, astaxanthin and canthaxanthin pigments, which are commonly mixed with feed materials to provide coloration in aquaculture, such as salmon, tend to be damaged less when they are not overcooked. The quantities of pigmentation required to achieve comparable results with conventional extrusion cooking processes can thus be reduced with a corresponding savings in processing costs.

Certain types of snack foods for human consumption, which are commonly referred to as third generation (3-G) snacks are commonly made from hard, glassy pellets which are fried for expansion before packing. Pre-gelatinized starches are commonly used in making such snack foods to reduce the effects of stress cracking, which can occur when the pellets are dried in their manufacture prior to frying same. Such pre-gelatinized starches tend to be relatively expensive and significant cost savings can thus be achieved by utilizing the slurry from the enhanced hydration subsystem 4 in the conditioning cylinder 10.

The slurry subsystem 4 of the present invention provides relatively low shear forces in the extruder 12 as compared to conventional extrusion cooking processes. This characteristic of the extrusion cooking system 2 can be used to advantage in extruding products conventionally made by baking, such as relatively hard dog biscuits and breadings. Low shear extrusion cooking of such products tends to reduce various problems which could otherwise occur therein, such as "white-spot" or "frosting", and further tends to reduce checking and breakage in biscuit-type products.

Pre-gelatinization can also be employed with the slurry subsystem 4 in order to provide a relatively light texture for extruded, ready-to-eat breakfast cereals. Such lighter textures can be achieved with the slurry subsystem 4 without the necessity of pre-gelatinized ingredients and the attendant expense thereof.

VI. Operation

In operation, the enhanced hydration or slurry subsystem 4 is provided for introducing high starch slurry into the conditioning cylinder 10. The slurry subsystem 4 includes a make-up tank 16 which receives water and high-starch powder, mixes same to form a slurry and discharges the slurry suspension to the pumping tank 20. From the pumping tank 20 the slurry suspension is pumped in metered amounts to the conditioning cylinder 10. Immediately prior to entry into the conditioning cylinder 10, or immediately thereafter, the slurry suspension is cooked and the starches therein pre-gelatinized. The pre-gelatinized starches provided by the slurry suspension upon entry into the conditioning cylinder 10 facilitate cooking, reduce energy consumption (both steam and electrical) by the extruder 12 and enhance certain desirable characteristics of the extruded product, such as its oil content.

VII. Modified Embodiment Enhanced Hydration Subsystem 102

Figure 2:
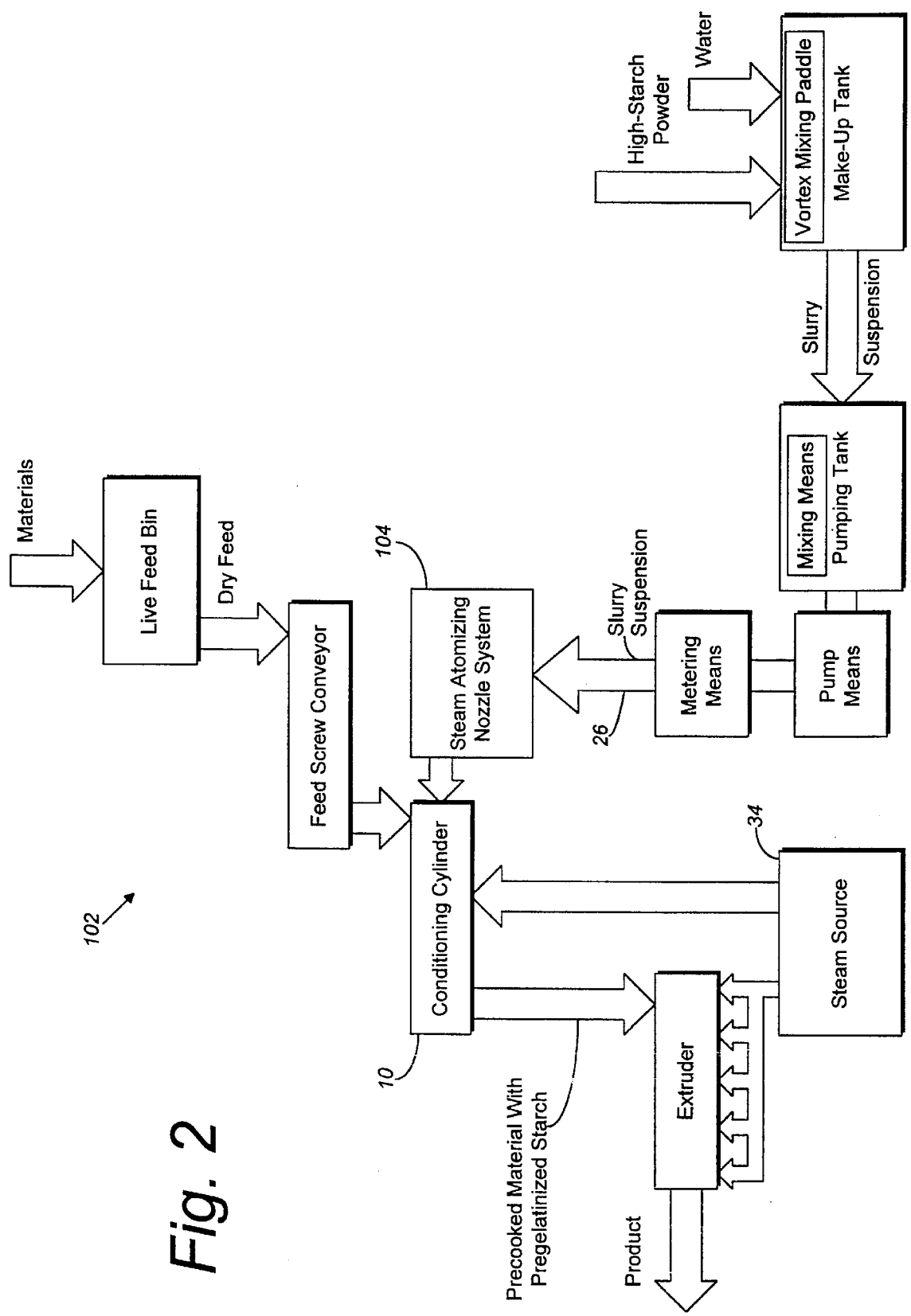
FIG. 2 is a schematic, block diagram of an enhanced hydration subsystem for an extrusion cooking system comprising a first modified embodiment of the present invention.

FIG. 2 shows an enhanced hydration subsystem 102 comprising a modified or alternative embodiment of the present invention. The modified embodiment slurry subsystem 102 utilizes a steam atomizing nozzle assembly 104.

The steam atomizing nozzle assembly 104 is connected to the steam source 34 and functions to atomize the slurry upon its injection into the conditioning cylinder 10. The steam atomizing nozzle assembly 104 is provided in the pumping tank-conditioning cylinder conduit 26 in place of, or in addition to, the in-line steam jet cooker 32.

It is to be understood that while certain forms of the present invention have been illustrated and described herein, it is not to be limited to the specific forms or arrangement of parts described and shown.

What is claimed and desired to be secured by Letters Patent is as follows:

1. In combination with an extrusion cooking system including: a feed bin for receiving feed materials; feed transporting means for transporting feed materials from the feed bin; a conditioning cylinder receiving materials from the feed transporting means and including means for pre-conditioning same; and an extruder receiving preconditioned materials from said conditioning cylinder and cooking same, the improvement of an enhanced hydration subsystem, which comprises:

(a) a slurry make-up tank receiving water and starch powder;

(b) slurry discharging means for discharging slurry from said slurry make-up tank;

(c) a pumping tank having inlet means fluidically connected to said slurry discharge means and outlet means fluidically connected to said conditioning cylinder;

(d) first slurry transfer means for transferring said slurry from said make-up tank to said pumping tank; and (e) second slurry transfer means for transferring said slurry from said pumping tank to said conditioning cylinder.

2. The system according to claim 1, which includes:
   (a) said second slurry transfer means comprising pump means and metering means for respectively pumping and metering said slurry from said pumping tank to said conditioning cylinder.

3. The invention according to claim 1, which includes:
   (a) said make-up tank having a vortex mixing paddle.

4. The invention according to claim 1, which includes:
   (a) said pumping tank having slurry mixing means.

5. The invention according to claim 4, which includes:
   (a) said slurry mixing means comprising a circulating pump.

6. The invention according to claim 4, which includes:
   (a) said slurry mixing means comprising a stirring mixer.

7. The invention according to claim 1, which includes:
   (a) an in-line steam jet cooker between said pumping tank and said conditioning cylinder.

8. The invention according to claim 1, which includes:
   (a) said conditioning cylinder having an inlet fluidically connected to said second slurry transfer means; and
   (b) a steam atomizing nozzle system between said pumping tank and said conditioning cylinder and located at said inlet to said conditioning cylinder.

9. A method of enhancing hydration in an extrusion cooking system including: a feed bin; feed conveying means for conveying feed from the feed bin; a conditioning cylinder with a conditioning cylinder inlet connected to the feed conveying means and a conditioning cylinder outlet; and an extruder having an extruder inlet connected to said conditioning cylinder outlet, which method includes the steps of:
   (a) providing a slurry make-up tank;
   (b) introducing water into said slurry make-up tank;
   (c) introducing high-starch powder into said slurry make-up tank;
   (d) mixing said water and said powder in said slurry make-up tank to provide a slurry mix;
   (e) providing a slurry pumping tank with an inlet and outlet;
   (f) pumping said slurry mix from said make-up tank to said pumping tank through said inlet;
   (g) mixing said slurry mix in said pumping tank;
   (h) pumping said slurry mix from said pumping tank to said conditioning cylinder; and
   (i) metering quantities of said slurry mix pumped from said pumping tank to said conditioning cylinder.

10. The method according to claim 9, which includes the additional step of:
    (a) introducing water and farinaceous powder into said make-up tank in a ratio of approximately between 1:1 and 3:1.

11. The method according to claim 10, which includes the additional step of:
    (a) introducing water and farinaceous powder into said make-up tank in a ratio of approximately 2:1.

12. The method according to claim 9, which includes the additional step of:
    (a) providing an in-line steam jet cooker between said pumping tank and said conditioning cylinder; and
    (b) steam cooking said slurry mix between said pumping tank and said conditioning cylinder.

13. The method according to claim 9, which includes the additional steps of:
    (a) providing a steam atomizing nozzle system between said pumping tank and said conditioning cylinder; and
    (b) steam atomizing said slurry mix between said pumping tank and said conditioning cylinder.

14. The process according to claim 11, which includes the additional step of:
    (a) steam-cooking said slurry mix in said conditioning cylinder upon introduction of said slurry mix into said conditioning cylinder.

15. A sinking marine feed product having a starch content in the range of about 5% to 12% and an oil content in the range of about 12% to 22%, which is made by a process comprising the steps of:
    (a) providing a feed bin;
    (b) placing feed materials in said feed bin;
    (c) providing a conditioning cylinder;
    (d) conveying feed materials from said feed bin to said conditioning cylinder;
    (e) providing an extruder;
    (f) conveying preconditioned, partially cooked materials from said conditioning cylinder to said extruder;
    (g) extruding said materials from said conditioning cylinder in said extruder;
    (h) providing a slurry make-up tank;
    (i) inserting water and farinaceous powder in said make-up tank and mixing same therein to form a slurry mix;
    (j) providing a pumping tank;
    (k) discharging said slurry mix from said make-up tank into said pumping tank;
    (l) pumping said slurry mix from said pumping tank into said conditioning cylinder; and
    (m) pregelatinizing a starch content in said slurry mix.

16. The product made by the process of claim 15, which includes the additional step of:
    (a) providing an in-line steam-jet cooker between said pumping tank and said conditioning cylinder and steam-jet cooking the slurry therewith.

17. The product made by the process of claim 15, which includes the additional steps of:
    (a) providing a steam atomizing nozzle system at an inlet to said conditioning cylinder and in communication with said pumping tank; and
    (b) steam atomizing said slurry suspension upon entry of same to said conditioning cylinder.

18. The product made by the process of claim 15, which includes the additional step of:
    (a) metering said slurry into said conditioning cylinder.

19. The product made by the process of claim 15, which includes the additional steps of:
    (a) providing said make-up tank with a vortex mixing paddle; and
    (b) stirring said slurry mix in the make-up tank with the vortex mixing paddle.

20. The product made by the process of to claim 15, which includes the additional steps of:
    (a) providing said pumping tank with mixing means; and
    (b) mixing said slurry suspension in said pumping tank with said mixing means.

* * * * *